June 6, 1961 W. G. SMITH 2,986,873
EXHAUST GAS PURIFIERS
Filed Aug. 13, 1957
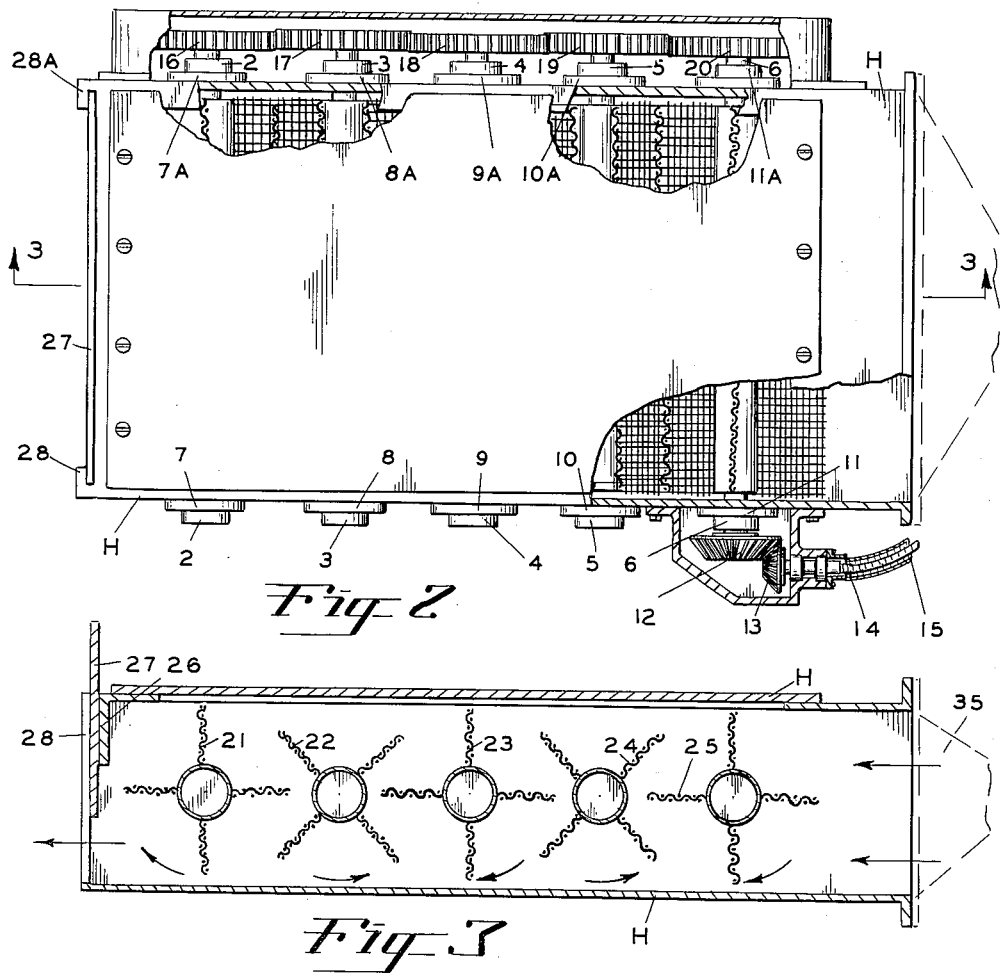
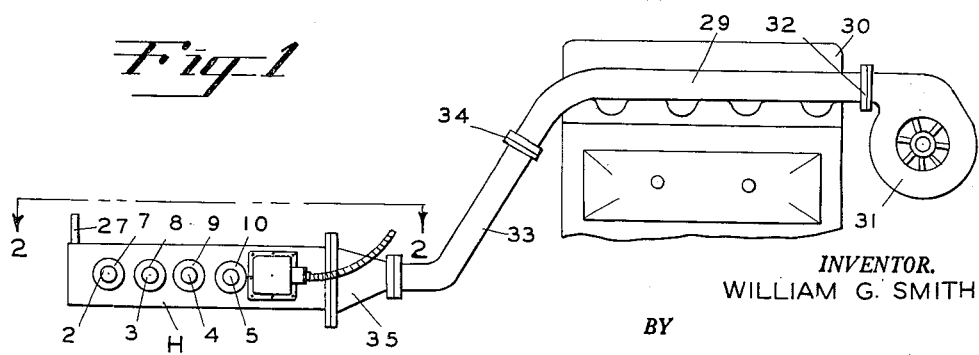
INVENTOR.
WILLIAM G. SMITH
BY Peter Haberlin
ATTORNEY 2,986,873
EXHAUST GAS PURIFIERS
William George Smith, 3129 NE. 80th Ave.,
Portland 13, Oreg.
Filed Aug. 13, 1957, Ser. No. 677,938
2 Claims. (Cl. 60—30)

This invention relates to exhaust gas purifiers, but more particularly to a structure that is adapted to be connected to exhaust pipes attached to automotive vehicles for the purpose of eliminating or reducing to a minimum all air pollutants which are emitted from the exhaust of motor vehicles, and while the disclosed embodiment is primarily intended for the aforesaid purpose, the principle could be applied to other structures by modifying the form of the present disclosure.

In the cities where large industrial plants are located, many air pollutants exist, among which are gasoline vapors, and although invisible and relatively harmless when they enter the air, their reaction with nitrogen oxides and natural ozone in the presence of sunlight, forms a substance that irritates the eyes, damages vegetation and reduces visibility. The word "smog" has been coined to describe such atmospheric condition, and the minute particles of exhaust fumes including smoke, dust or mist, have been named "Aerosols."

In cities where temperature inversions exist, an invisible ceiling is caused and the cooler polluted air cannot rise above this inversion air and so is unable to dissipate into the upper atmosphere unless aided by strong winds.

One object of this invention is to eliminate particles of matter, either solid, gaseous or liquid, that can be suspended in the air, and which are caused by the emission of various forms of exhaust vapors.

Another object of the embodiment of this invention is to provide a series of screens mounted on shafts and attached to the exhaust end of motor vehicles for purposes to be hereinafter fully set forth.

A further object is to dilute carbon monoxide, or other noxious gases from the exhaust of any explosive engine and render them harmless.

This applicant has proven by tests made by the Colorometric Carbon Monoxide Tester developed by the National Bureau of Standards, that by the use of a blower-type fan of 1.5 H.P. with air intake velocity of 325 m.p.h., then to a series of cruciform revolving screens (1750 r.p.m.), and air volume of 230 feet per minute, operated by a motor running at 11,400 r.p.m., that the volume of CO amounts to but .03 to .02 of CO.

In order to more fully explain the advantages and operation of the embodiment of this invention, reference must be made to the accompanying drawings, which, taken in connection with the following specification and appended claims, form part of this application, of which:

FIG. 1 is a schematic view of the application of the disclosed embodiment of the invention to a motor vehicle;

FIG. 2 is a top plan view of a preferred embodiment of the invention;

FIG. 3 is a longitudinal section taken on line 3—3 of FIG. 2 showing the fans attached to their respective driving shafts.

Now, with more detailed reference to the drawings, the letter H indicates a housing having mounted therein a plurality of shafts 2—3—4—5—6, which are journaled in bearings 7—7A—8—8A—9—9A—10—10A and 11—11A, which are supported by said housing, while shaft 6 is revolved by means of a gear 12 attached thereto and driven by pinion 13 which is affixed to shaft 14 from which extends a flexible shaft 15 connecting to a motor placed in any convenient place within the vehicle, or said flexible shaft could be connected to the motor which drives the vehicle; while a train of spur gears, 16—17—18—19—20, affixed to shafts 2—3—4—5—6 at the opposite side of the housing from the driving side cooperate with the driving means to rotate the shafts 2—3—4—5—6, but affixed to said shafts and concentric therewith are a plurality of cruciform screens, 21—22—23—24—25 which are driven toward each other as the spur gears intermesh during rotation at a high speed, causing the noxious gases to be converted into $CO_2$ when emitted from the free end of housing H.

At the free end of housing H is a baffle plate 26 which partly closes the opening, while a slide valve 27 movable in guides 28—28A are used to regulate the space in said opening as desired for the purpose of permitting greater or lesser volume of the exhaust to pass through said opening.

In order to operate the disclosed embodiment of this invention, the exhaust manifold 29 is connected to blower fan 31 by means of flange 32, while pipe 33 which is attached to said exhaust manifold by means of coupling 34, while a reducing connector 35 connects housing H with said pipe 33. When said housing is connected as above described, blower 31 is driven at a high speed, thus causing the exhaust to pass through the screens which are formed of wire mesh and into the atmosphere in the form of carbon dioxide lacking the amounts as described in an analysis enclosed with and forming part of this application.

The enclosed analysis is a report given to this applicant by R. W. Newburgh, chairman, Moss Spectrometer Committee of the School of Science, Oregon State College, at Corvallis, Oregon. This analysis according to the chart, is self-explanatory to a chemist.

While the structure has been described in detail and with specific illustrations, it is to be understood that other modifications in construction and arrangements of parts may be devised without departing from the spirit and scope of the invention. The present embodiment is illustrative but not restrictive, since the scope and purview of the invention is indicated by the appended claims rather than by the foregoing description.

Having thus fully described and illustrated a preferred embodiment of the invention in a manner that may enable others skilled in the art to which it appertains to construct and use the same, what is claimed and desired to be secured by Letters Patent is:

1. An exhaust gas purifier attached to the manifold of an internal combustion engine, comprising a pipe connected to an exhaust manifold, a reducing connector coupled to said pipe, a housing attached to the connector, a blower connected to the end of said manifold remote from the housing to force air through the manifold and housing, bearings attached to and supported by each side of said housing, rotatable shafts journaled in said bearings, intermeshing spur gears affixed to one end of said shafts, cruciform wire screens driven toward each other mounted on said shafts within the housing, a miter gear affixed to one of said shafts, a pinion intermeshing with said miter gear, a stub shaft affixed to said pinion, a motor driven flexible shaft extending from said stub shaft to rapidly rotate the screens causing a dilution of exhaust gases as air is being forced through the manifold and housing by the blower, a baffle plate partially closing the exhaust end of said housing, guides affixed to the exhaust end of said housing, and a slide valve reciprocally operable in said guides to regulate the volume of flow through said exhaust end of the housing.

2. An exhaust gas purifier attached to the manifold of an internal combustion engine, comprising a pipe connected to one end of an exhaust manifold, a reducing connector coupled to said pipe, a housing attached to the connector, a power-operated blower connected to the end of the manifold remote from the housing to force air through said manifold and housing, bearings attached to and supported by each side of said housing, rotatable shafts journaled in said bearings, intermeshing spur gears affixed to one end of said shafts, cruciform wire screens driven toward each other, mounted longitudinally of said shafts within the housing, a miter gear affixed to one end of said shafts, a pinion intermeshing with said miter gear, a stub shaft affixed to said pinion, a motor driven flexible shaft connected to and extending from the stub shaft to rapidly rotate the screens causing the forced air from the blower to dilute and purify the exhaust gases passing from the manifold into the housing, a baffle plate partially closing the exhaust end of the housing, guides affixed to the exhaust end of said housing, and a slide valve reciprocally operable in said guides to regulate the volume of exhaust passing through the free end of said housing.

References Cited in the file of this patent

UNITED STATES PATENTS

| | | |
|---|---|---|
| 1,846,057 | Ilg | Feb. 23, 1932 |
| 2,188,717 | Jones | Jan. 30, 1940 |
| 2,211,795 | Sauer | Aug. 20, 1940 |
| 2,217,241 | Tendler | Oct. 8, 1940 |
| 2,548,966 | Gilmore | Apr. 17, 1951 |
| 2,600,733 | Cliff | June 17, 1952 |
| 2,747,844 | Slayter | May 29, 1956 |
| 2,795,488 | Reitzel et al. | June 11, 1957 |
| 2,803,309 | Baker | Aug. 20, 1957 |